Patented Apr. 15, 1941

2,238,594

UNITED STATES PATENT OFFICE 2,238,594

CATALYTIC TREATMENT OF HYDROCARBONS

Boris Malishev, Elizabeth, N. J., assignor to Standard Oil Development Company, a corporation of Delaware No Drawing. Application May 5, 1937, Serial No. 141,004. In Great Britain May 14, 1936

8 Claims. (Cl. 260—667)

This invention relates to the treatment of hydrocarbons with phosphorus pentoxide ($P_2O_5$) to effect molecular rearrangement and pertains more particularly to a method of activating the reaction.

I have heretofore disclosed the treatment of hydrocarbons in the presence of phosphorus pentoxide to effect alkylating and polymerizing reactions.

One object of my invention is to provide an improved catalyst for hydrogenation or dehydrogenation of hydrocarbons in which the ratio of carbon and hydrogen in the molecule is changed.

Another object of the present invention is to provide a method of activating the phosphorus pentoxide to improve the yield and rate of reaction.

I have now found that phosphorus pentoxide in addition to favoring alkylating and polymerizing reactions also favors hydrogenation and dehydrogenation of hydrocarbons.

I have also found that the catalytic properties of phosphorus pentoxide for carrying out any of the above types of reactions are considerably enhanced if the reaction is carried out in the presence of hydrogen, gaseous hydrides, or compounds capable of liberating hydrogen or gaseous hydrides under reaction conditions.

The term gaseous hydrides as here employed is intended to mean hydrogen and normally gaseous binary compounds of hydrogen and one other element or radical capable of acting as an element. As examples of such hydrides, $H_2S$, HCl, HBr, HI, HF, and HCN, of which the halogen hydrides are most effective and particularly HCl.

Water is a hydride of oxygen and I have found that small amounts of it activate phosphorus pentoxide, but excessive amounts of water are very detrimental to its activity.

For example, I have found that a very dry phosphorus pentoxide is less active than a product which has slightly absorbed moisture. With absorption of more moisture phosphorus pentoxide becomes wet and loses its catalytic activity appreciably. Meta phosphoric acid and ortho phosphoric acid are considerably weaker catalysts, in the above hydrocarbon reactions, than $P_2O_5$.

Molecular hydrogen is chemically analogous to a hydride. I have found that small amounts of hydrogen activate phosphorus pentoxide while large quantities of hydrogen hydrogenate the hydrocarbons. Thus, with large quantities of hydrogen benzene at 300° C., is converted into cyclohexene and ethylene, at 250° C., into a mixture of saturated hydrocarbons. I have found that at higher temperatures, such as 400° C., the reaction is reversed and phosphorus pentoxide acts then as a dealkylating and dehydrogenating catalyst. Thus diethylbenzene is converted into benzene and ethylene. Isooctane is converted into a mixture of gaseous olefins.

I have found also that mercaptans, alkylchlorides and nitriles are very effective activators of phosphorus pentoxide, in the above hydrocarbon reactions. This I explain by the fact that these compounds generate $H_2S$ and HCl and HCN in the course of the above hydrocarbon reactions.

The following examples will serve to indicate the effectiveness of my activating agents for phosphorus pentoxide in carrying out different types of catalytic reactions.

Example 1

A mixture of 780 gm. of benzene, equal to 10 mols, 50 gm. of phosphorus pentoxide and 10 gm. of lampblack, was heated in an autoclave of 3 liters capacity for 60 minutes at 250° C. with agitation while a gas pressure of 30 atmospheres was maintained by introduction of ethylene. The amount of ethylene absorbed for alkylation was 562 gm. equal to 20.1 mols.

Example 2

A mixture of 780 gm. of benzene equal to 10 mols, 50 gm. of phosphorus pentoxide, 10 gm. of lampblack and 1 cc. of liquefied HCl gas in a glass sealed tube, was charged into an autoclave of 3 liter capacity. Ethylene was then introduced to maintain a pressure of 30 atmospheres, while heating the autoclave for 60 minutes at 250° C. with agitation. The paddles by agitation crushed the HCl glass tube. The amount of ethylene absorbed for alkylation was 731 gm. equal to 26 mols.

Example 3

A mixture of 780 gm. of benzene, equal to 10 mols, 50 gm. of phosphorus pentoxide and 10 gm. of lampblack was charged into an autoclave of 3 liters capacity. Hydrogen sulphide gas was introduced to an excess pressure of one atmosphere and the autoclave heated for 60 minutes at 250° C. with agitation while a gas pressure of 30 atmospheres was maintained by introduction of ethylene. The amount of ethylene absorbed for alkylation was 675 gm. equal to 24 mols.

Example 4

A mixture of 500 gm. benzene, 50 gm. of phosphorus pentoxide, 10 gm. of lampblack and 5 gm. of cresol was heated in an autoclave for 120 minutes at 300° C. with agitation while a pressure of 100 atmospheres of hydrogen was maintained. The product was removed from the autoclave and distilled to dryness. The distillate came over between the temperatures, 80° C. to 85° C. and was a mixture of about equal parts of benzene and cyclohexene.

Example 5

A mixture of 500 cc. of 1-butene, 50 gm. of phosphorus pentoxide, 10 gm. of lampblack and 5 gm. of cresol was charged into a cooled autoclave and then heated at 250° C., for 20 minutes with agitation while a pressure of 100 atmospheres of hydrogen was maintained. A liquid polymer consisting of a mixture of saturated hydrocarbons and isoparaffines (by antimony chloride test) was obtained.

Example 6

A mixture of 1000 cc. (7150 gm.) of diisobutylene, corresponding to 6.4 mols, 50 gm. of phosphorus pentoxide and 50 gm. of lampblack, was heated in an autoclave of 1-gallon capacity (3785 cc.) for six hours at an average temperature of 400° C. with agitation. A maximum temperature of 463° C. was maintained for two hours. The initial hydrogen pressure charged was 50 atmospheres, corresponding to 135.5 liters of hydrogen equal to 5.6 mols. The final pressure of the gas was 29 atmospheres.

The amount of gas obtained was 170 liters and analyzed:

| | Per cent |
|---|---|
| Unsaturated | 0.8 |
| Saturated | 79.2 |
| Hydrogen | 17.2 |
| Air+CO | 2.8 |

The bulk of saturated hydrocarbons consisted of butane. The amount of unreacted hydrogen was equal to 29.2 liters, or 1.2 mols. Amount of hydrogen consumed was 78.5%.

The amount of liquid product obtained was 410 cc. of specific gravity 0.7145; initial boiling point, 25° C., final boiling point, 230° C. The product analyzed 7% unsaturated and 35% aromatics.

Example 7

A mixture of 1500 cc. (1073 gm.) of diisobutylene, corresponding to 9.6 mols, 50 gm. of phosphorus pentoxide and 10 gm. of lampblack was heated in an autoclave of 1-gallon capacity (3785 cc.) for seven hours at an average temperature of 363° C. with agitation. A maximum temperature of 387° C. was maintained for three hours. The initial hydrogen pressure charged was 68 atmospheres, corresponding to 140 liters of hydrogen equal to 5.6 mols. The final pressure of the gas was 41.5 atmospheres. The gas freed from butane amounted to 118.5 liters, and analyzed:

| | Per cent |
|---|---|
| Unsaturated | 0.0 |
| $CH_4$ | 8.2 |
| $C_2H_6$ | 5.7 |
| $C_2H_8$ | 8.8 |
| $C_4H_{10}$ | 9.6 |
| $C_5H_{12}$ | 0.7 |
| Hydrogen | 63.3 |
| Air+CO | 3.8 |

The amount of unreacted hydrogen was equal to 75 liters, or 3.1 mols. Amount of hydrogen consumed was 46.5%.

The amount of condensed butane was 400 cc. of specific gravity 0.618. The amount of diisobutylene converted into gaseous products was about 300 cc.; liquid product recovered 770 cc.

Approximate balance:

| | Cc. |
|---|---|
| Diisobutylene as butane | 400 |
| Diisobutylene as gaseous product | 300 |
| Liquid product | 770 |
| Total | 1470 |

The initial boiling point of the liquid product was 44° C.; 90% boiled at 188° C.(=370° F.).

The liquid product was fractionated in three cuts and analyzed as follows:

| Cut | Amount, cc. | Bromine, g. per g. | Percent unsaturated | Percent aromatic |
|---|---|---|---|---|
| 44–205° C | 580 | 0.44 | 31.6 | |
| 205–260° C | 116 | 0.25 | 38.6 | 44.0 |
| Bottoms | 50 | | | |

I have also found that the refining of gasoline in the presence of phosphorus pentoxide is improved by the presence of the above-named activators.

It will be understood that the temperature time of treatment and other conditions set forth in the examples for effecting the different types of reaction are illustrative rather than limitive.

Having described the preferred embodiment of my invention and having given specific examples thereof, it is understood that it embraces such other variations and modifications as come within the spirit and scope thereof. It will also be understood that it is not my inention to unnecessarily restrict the invention or dedicate any patentable features thereof.

I claim:

1. In the process of treating hydrocarbons in the presence of a catalyst consisting of phosphorus pentoxide catalyst to effect molecular rearrangement of the hydrocarbon molecules, the improvement which comprises carrying out the treatment in the presence of a gaseous hydride of the class consisting of normally gaseous binary compounds of hydrogen with one other element other than oxygen or a radical capable of acting as an element.

2. In the process of treating a mixture of olefins and aromatics to form alkylated aromatics wherein the mixture is treated in the presence of a catalyst consisting of phosphorus pentoxide under conditions suitable for alkylating said aromatics, the improvement which comprises activating said phosphorus pentoxide with a gaseous hydride.

3. In the process of converting straight chain hydrocarbons into branched chain hydrocarbons wherein straight chain hydrocarbons are treated in the presence of a catalyst consisting of phosphorus pentoxide at elevated temperatures, the improvement which comprises carrying out the treatment in the presence of a gaseous hydride.

4. In the process for treating hydrocarbons wherein the hydrocarbon molecules are caused to undergo molecular rearrangement, the improvement which comprises contacting said hydrocarbons with a catalyst consisting of phosphorus pentoxide and carrying out the reaction in the presence of a gaseous hydride taken from the class consisting of hydrogen halides and hydrogen sulphide.

5. A process for hydrogenating hydrocarbons containing at least one double bond which comprises subjecting said hydrocarbons to a hydrogen atmosphere at a temperature of from about 250° C. to about 500° C. and to elevated pressure in the presence of a catalyst consisting of phosphorus pentoxide for a time sufficient to effect a substantial degree of hydrogenation.

6. A process of treating hydrocarbons containing at least one double bond suitable for hydrogenation which comprises hydrogenating said hydrocarbons in the presence of an activated catalyst consisting of phosphorus pentoxide and hydrogen at an initial pressure of 100 atmospheres and at a temperature of from about 250° to 500° C. for a time sufficient to form a substantial yield of hydrogenated products.

7. A process of treating aromatic hydrocarbons to form naphthenes which comprises passing a mixture of aromatic hydrocarbons and hydrogen through a catalytic zone containing a catalyst consisting of phosphorus pentoxide, maintaining said zone under elevated pressure and at a temperature of from about 250° C. to about 500° C. whereby said hydrogen is caused to combine with said aromatic hydrocarbons to form hydroaromatics.

8. A process for hydrogenating hydrocarbons, the improvement which consists in carrying out the reaction in the presence of a catalyst consisting of phosphorus pentoxide and an activator therefor consisting of a gaseous hydride selected from the class consisting of $H_2S$, $HCl$, $HBr$, $HI$, and $HF$.

BORIS MALISHEV.